United States Patent
Nemoto

[11] Patent Number: 6,137,758
[45] Date of Patent: Oct. 24, 2000

[54] OPTICAL DISC DISCRIMINATING APPARATUS

[75] Inventor: Shigeru Nemoto, Yokohama, Japan

[73] Assignee: Victor Company of Japan, Ltd., Yokohama, Japan

[21] Appl. No.: 09/084,795

[22] Filed: May 27, 1998

[30] Foreign Application Priority Data

May 27, 1997 [JP] Japan .................................... 9-152980

[51] Int. Cl.$^7$ .................................................. G11B 7/00
[52] U.S. Cl. ...................... 369/58; 369/44.29; 369/44.35
[58] Field of Search ............................ 369/44.41, 44.37, 369/44.26, 44.35, 44.36, 54, 58, 44.29, 44.27

[56] References Cited

U.S. PATENT DOCUMENTS

| | | | |
|---|---|---|---|
| 5,587,981 | 12/1996 | Kamatani ................................... | 369/58 |
| 5,592,448 | 1/1997 | Suzuki et al. .......................... | 369/44.28 |
| 5,708,636 | 1/1998 | Takahashi et al. ..................... | 369/44.26 |
| 5,745,461 | 4/1998 | Kawasaki .................................. | 369/58 |
| 5,903,531 | 5/1999 | Satoh et al. .............................. | 369/58 |

FOREIGN PATENT DOCUMENTS

| | | |
|---|---|---|
| 06068506 | 3/1994 | Japan . |
| 06301980A | 10/1994 | Japan . |

OTHER PUBLICATIONS

Patent Abstracts of Japan, vol. 96, No. 7, Jul. 31, 1996, & JP 08 083465 A (Sony Corp), Mar. 26, 1996.
Patent Abstracts of Japan, vol. 98, No. 6, Apr. 30, 1998, & JP 10 055599 A (Samsung Electron Co Ltd), Feb. 24, 1998.
Patent Abstracts of Japan, vol. 97, No. 5, May 30, 1997 & JP 09 017106 A (Aiwa Co Ltd), Jan. 17, 1997.
Patent Abstracts of Japan, vol. 96, No. 9, Sep. 30, 1996, & JP 08 115525 A (Sanyo Electric Co Ltd), May 7, 1996.
Patent Abstracts of Japan, vol. 96, No. 6, Jun. 28, 1996 & JP 08 036827 A (Victor Co of Japan Ltd), Feb. 6, 1996.
Patent Abstracts of Japan, vol. 95, No. 2, Mar. 31, 1995 & JP 06 318323 A (Nippon Columbia Co Ltd), Nov. 15, 1994.
Patent Abstracts of Japan, vol. 18, No. 315, Jun. 15, 1994 & JP 06 068506 A (Sony Corp), Mar. 11, 1994.

*Primary Examiner*—Thang V. Tran
*Attorney, Agent, or Firm*—Jacobson, Price, Holman & Stern, PLLC

[57] ABSTRACT

An optical disc discriminating apparatus has an optical pickup that irradiates a main beam and a pair of sub-beams onto an optical disc to read a signal recorded thereon. The optical pickup has a pair of sub-beam detectors for detecting the sub-beams reflected from the optical disc to generate detection signals. A tracking error signal is produced on the basis of a differential of the detection signals. A type of the optical disc is judged on the basis of comparison between an amplitude of the tracking error signal and a reference amplitude. Or, it is judged on the basis of comparison between an phase difference between the detection signals and a reference phase difference. The judgement under both amplitude and phase comparison is also preferable. The optical pickup conducts tracking servo control on the basis of the detection signals after the judgement is made.

2 Claims, 7 Drawing Sheets

OPTICAL DISC DISCRIMINATING APPARATUS

BACKGROUND OF THE INVENTION

The present invention relates to an optical disc discriminating apparatus for enabling reproduction of a plurality of optical discs different in track pitch by an optical disc player.

At present, two types of optical discs, which are the same in substrate shape and reflectance of a signal recording surface but different in track pitch, have been proposed. One of them is a compact disc (CD), and the other is a digital versatile (video) disc (DVD) that is a high-density optical disc. The track pitch of the former is 1.6 $\mu$m, and that of the latter is 0.74 $\mu$m, which respectively require a separate tracking servo system. Two types of reproducing mechanisms are essentially necessary in order to reproduce the two types of discs. However, recently, an optical disc player having the reproducing function of both the optical discs has been demanded in consideration of a user's burden.

A disc player for reproducing two different types of discs is disclosed, for example, in Japanese Patent Laid-Open No. 1994(6)-68506.

According to the technique disclosed in the aforementioned Publication, a laser beam is irradiated onto a track pitch identifying information indicating portion on the optical disc on which information relating to the track pitch is recorded. A laser beam reflected from the track pitch identifying information portion is detected to discriminate between optical discs different in track pitch to control tracking servo according to the identified track pitch.

As described above, in the conventional arrangement, the tracking servo according to the respective track pitches are necessary to reproduce two types of discs, but the type of the optical discs need be discriminated in advance in order to switch the two types of tracking servo methods. However, at present, since the substrate shape of the disc and the reflectance of the signal recording surface are the same, the discrimination prior to application of the tracking servo is difficult.

Further, in the technique disclosed in the aforementioned Publication, it has been necessary that for discriminating between the optical discs different in track pitch, as a track pitch identifying information portion, a groove is provided between a signal recording area of the disc and a chucking hole provided in the center of the disc for holding the disc, or a flat mirror surface is provided in the periphery of the chucking hole, so that the intensity of laser beams reflected from the track pitch identifying information portions are differentiated according to the types of the optical discs.

SUMMARY OF THE INVENTION

An object of the invention is to provide an optical disc discriminating apparatus capable of discriminating between different types of discs and capable of making discrimination prior to application of tracking servo, without recording of track pitch identifying information on the discs.

The present invention provides an optical disc discriminating apparatus comprising: optical means for irradiating and focussing a main beam and a pair of sub-beams onto an optical disc to read a signal recorded thereon, the optical means having a pair of sub-beam detectors for detecting the sub-beams reflected from the optical disc to generate detection signals; a producer to produce a tracking error signal on the basis of at least a differential of the detection signals; and judging means for judging a type of the optical disc on the basis of comparison between an amplitude of the tracking error signal and a reference amplitude, the optical means conducting tracking servo control on the basis of the detection signals after the judgement is made.

Further, the present invention provides an optical disc discriminating apparatus comprising: optical means for irradiating a main beam and a pair of sub-beams onto an optical disc to read a signal recorded thereon, the optical means having a pair of sub-beam detectors for detecting the sub-beams reflected from the optical disc to generate detection signals; a detector to detect a phase difference between the detection signals; and judging means for judging a type of the optical disc on the basis of comparison at least between the phase difference and a reference phase difference, the optical means conducting tracking servo control on the basis of the detection signals after the judgement is made.

DETAILED DESCRIPTION OF THE PREFERRED EMBODIMENTS

Figure 1:
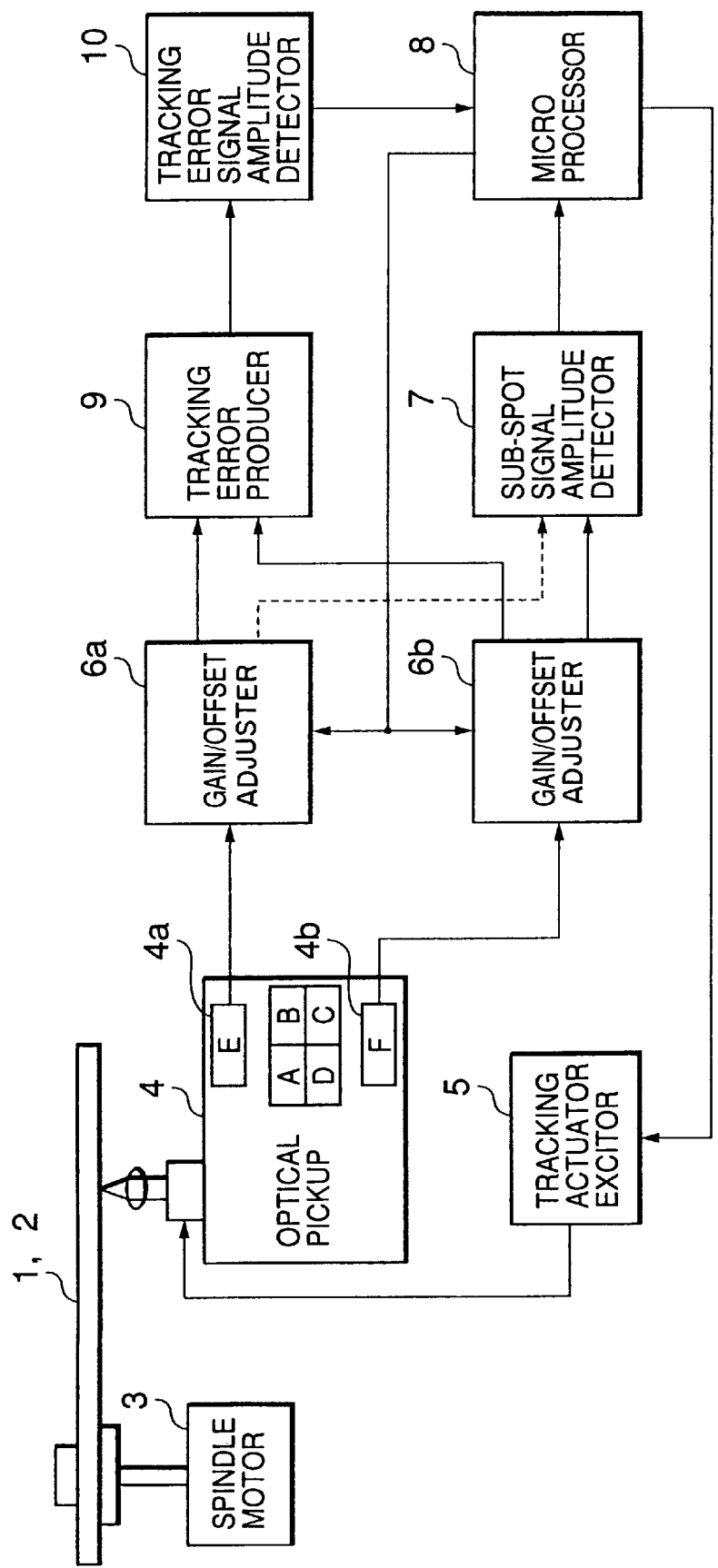
FIG. 1 is a block diagram showing a first embodiment of an optical disc discriminating apparatus according to the present invention.

The detailed embodiments of the optical disc discriminating apparatus according to the present invention will be described hereinafter with reference to the accompanying drawings. Elements the same as or analogous to each other among the embodiments will be referenced by the same reference numerals.

FIG. 1 is a block diagram showing a first embodiment of an optical disc discriminating apparatus according to the present invention.

An optical disc 1 or 2 shown in FIG. 1 is formed with a disc substrate of a transparent material such as polycarbonate, and a signal recording layer of a metallic material affixed to the disc substrate. A bit signal train is spirally recorded on the signal recording layer. A spacing between tracks each having a signal train recorded therein as described above is called a track pitch. In the first optical disc 1, the track pitch is 1.6 μm, and in the second optical disc 2, the track pitch is 0.74 μm. Either one of the two types of discs is loaded on a disc player and rotated by a spindle motor 3.

An optical pickup 4 includes a laser diode for irradiating a laser beam onto the signal recording layer of the optical disc 1 or 2 for reading signals recorded thereon. The optical pickup 4 divides a part of the laser beam emitted from the laser diode and irradiates the divided beams onto positions away by a distance corresponding to +¼ of the track pitch of the first optical disc 1 from the center of the bit signal train on the optical disc, and produces a pair of sub-beams for 3-beam tracking servo control.

The optical pickup 4 further includes a focus servo mechanism for focussing the irradiated laser beam on the signal recording layer, a pair of optical detectors (generally, called E and F sensors with respect to a main sensor divided into four, A to D) 4a and 4b for detecting the intensity of light of the sub-beam returned after being reflected from the signal recording layer, and a tracking actuator for moving a condenser lens of the focus servo mechanism.

Rotation of the optical disc 1 or 2 while the focus servo mechanism is on, obtains sub-beam signals with the pair of optical detectors. The sub-beam signals correspond to track loss produced due to eccentric components of the disc itself or those generated while the disc 1 or 2 is being loaded. In the present embodiment, a tracking actuator exciter 5 is provided in consideration of the absence of the eccentric to excite the tracking actuator with a signal such as a triangular wave or sine wave to obtain the sub-beam signals corresponding to the track loss.

The sub-beam signals obtained by the pair of optical detectors of the optical pickup 4 as described above are adjusted in gain and offset through gain/offset adjusters 6a and 6b and output while signal levels and amplitudes thereof are detected by a sub-spot signal amplitude detector 7. The sub-beam signals are adjusted to suitable levels and amplitudes by a microprocessor 8 that outputs a adjustment control signal to the gain/offset adjusters 6a and 6b on the basis of a detected signal supplied by the sub-spot signal amplitude detector 7. Then difference in signal level and amplitude of the adjusted sub-beam signals are respectively taken by a tracking error producer 9 and converted into a tracking error signal.

In FIG. 1, the output line from the gain/offset adjuster 6a to the sub-spot signal amplitude detector 7 is indicated by the dotted line. This shows that an output of only one of the gain/offset adjusters 6a and 6b will suffice to be applied to the sub-spot signal amplitude detector 7.

Figure 2:
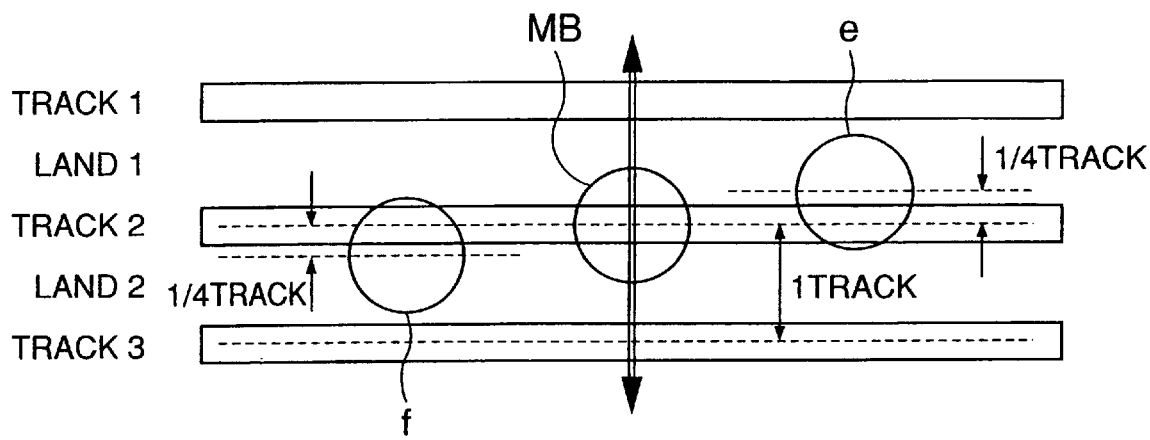
FIG. 2 illustrates positional relationships between sub-beam spots and tracks of 1.6 $\mu$m-pitch.

FIG. 2 shows the positional relationships between sub-beams for reproducing CDs and tracks while a main beam MB is positioned on a track 2 with 1.6 μm-pitch.

In FIG. 2, the sub-beam spots e and f which are the sub-beams obtained from the pair of optical detectors of the optical pickup 4 are positioned as deviated in different directions by ¼ track pitch portion with respect to the track of 1.6 μm-pitch of the first optical disc (CD) 1. That is, the positional relationships between the beam spots and the tracks are displaced in the direction as indicated by arrows in the figure due to eccentric of the optical disc 1 itself or the operation of the tracking actuator exciter 5.

Figure 3:
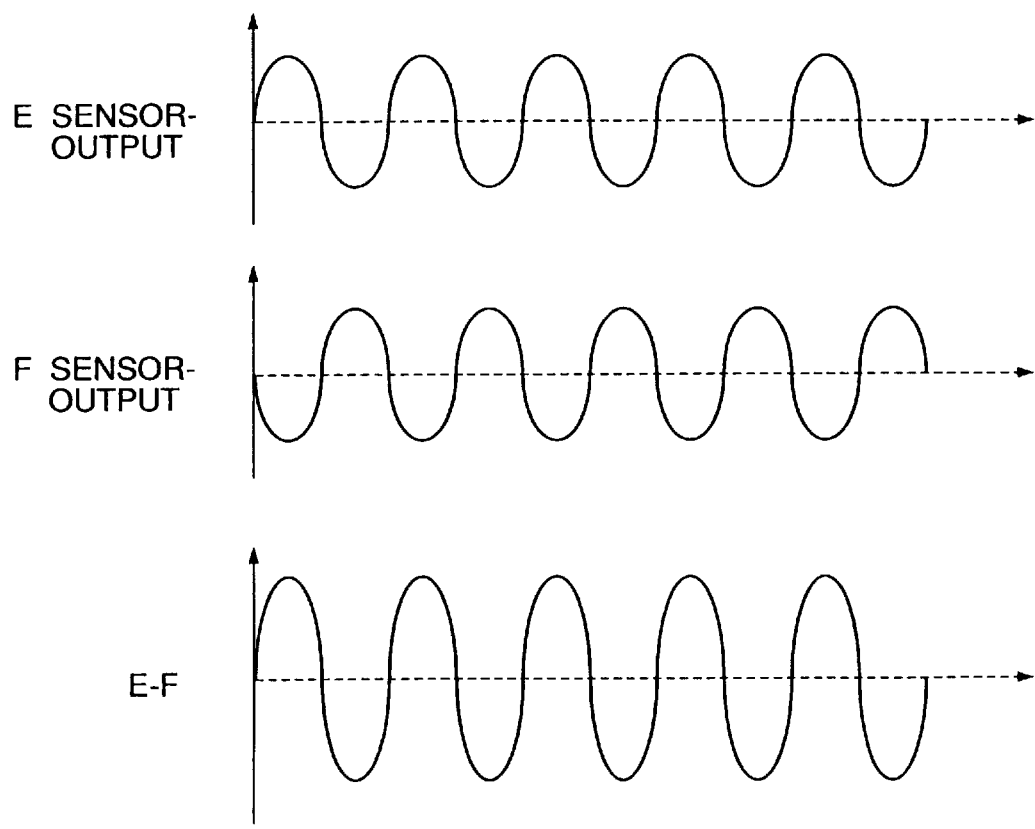
FIG. 3 illustrates waveforms of a pair of sub-beam signals and a tracking error signal under the positional relationships shown in FIG. 2.

FIG. 3 illustrates waveforms of outputs of the E sensor (optical detector 4a) and the F sensor (optical detector 4b) and the tracking error signal (E-F) under the positional relationships shown in FIG. 2.

When the beam spots and the tracks are in the positional relationships shown in FIG. 2, signal levels obtained from the E and F sensors are the same. However, thereafter, as the sub-beam spot e comes near a land 1 between tracks 1 and 2, whereas the sub-beam spot f comes near the track 2, an output level Oe of the E sensor increases, whereas an output level Of of the F sensor reduces.

The level Oe becomes the maximum when the sub-beam spot e reaches the land center, whereas since at that time, the sub-beam spot f is in the track center, the level Of becomes the minimum, and the level of the tracking error signal obtained by (Oe-Of) becomes the maximum as shown in FIG. 3.

On the other hand, the level Oe becomes the minimum when the sub-beam spot e reaches a track center, whereas since at that time, the sub-beam spot f is in a land center, the level Of becomes the maximum, and the level of the tracking error signal obtained by (Oe-Of) becomes the minimum.

Figure 4:
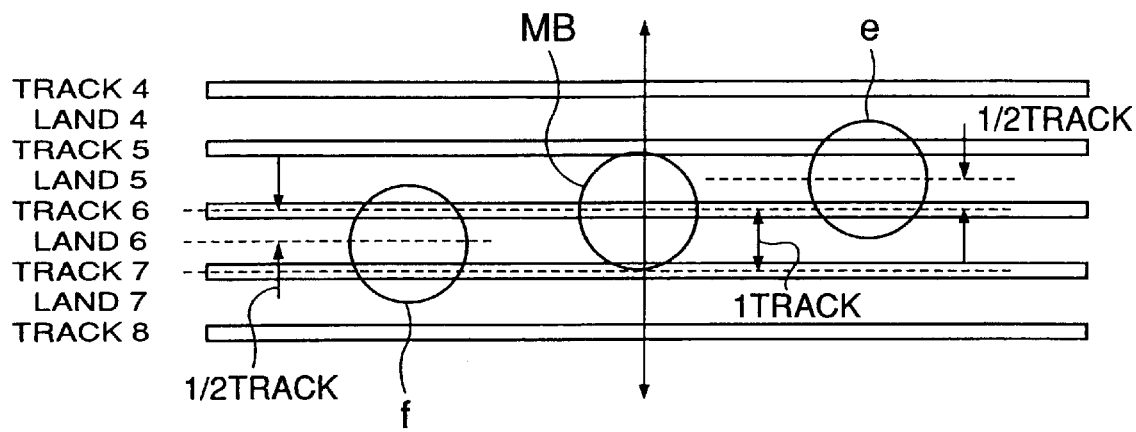
FIG. 4 illustrates positional relationships between sub-beam spots and tracks of 0.74 $\mu$m-pitch.

Next, FIG. 4 illustrates positional relationships between sub-beam spots for reproducing CDs (CD and DVD) and tracks while the main beam MB is positioned on a track 6 of a DVD with 0.74 μm-track pitch.

In FIG. 4, the sub-beam spots e and f which are the sub-beams obtained from the pair of optical detectors of the optical pickup 4 are positioned as deviated in different directions by ½ track pitch portion with respect to the track of 0.74 μm-pitch of the second optical disc 2 (DVD). That is, the positional relationships between the beam spots and the tracks are displaced in the direction as indicated by arrows in the figure due to eccentric of the optical disc 2 itself or the operation of the tracking actuator exciter 5.

Figure 5:
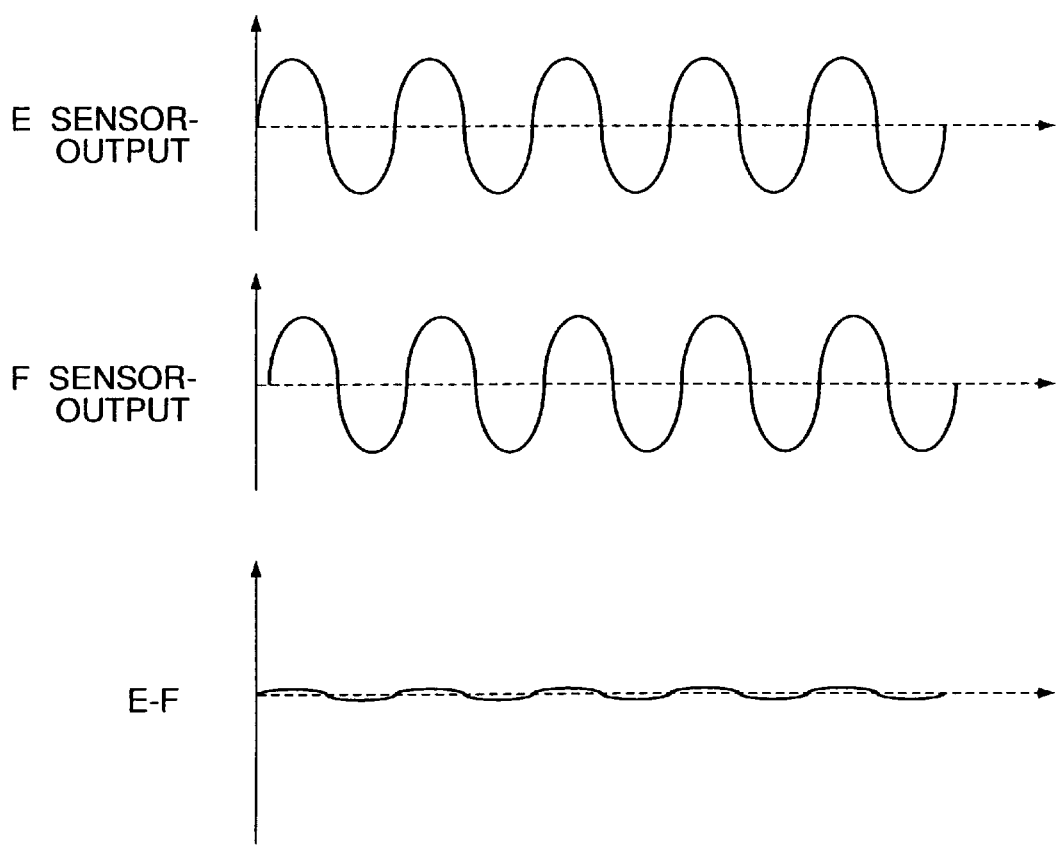
FIG. 5 illustrates waveforms of a pair of sub-beam signals and a tracking error signal under the positional relationships shown in FIG. 4.

FIG. 5 illustrates waveforms of outputs of the E and F sensors and a tracking error signal (E-F) under the positional relationships shown in FIG. 4.

When the beam spots and the tracks are in the positional relationships shown in FIG. 4, signal levels obtained from the E and F sensors are the same. However, thereafter, as the sub-beam spot e comes near a land 5 between tracks 5 and 6, the sub-beam spot f also comes near a land 6 between tracks 6 and 7, an output level Oe of the E sensor increases, and an output level Of of the F sensor also increases.

The level Oe becomes the maximum when the sub-beam spot e reaches the land center, and since at that time, the sub-beam spot f is also in the land center, the level Of also becomes the maximum, and the level of the tracking error signal obtained by (Oe-Of) becomes the substantially amplitude central value as shown in FIG. 5.

On the other hand, the level Oe becomes the minimum when the sub-beam spot e reaches a track center, and since at that time, the sub-beam spot f is also in a track center, the level Of becomes the minimum, and the level of the tracking error signal obtained by (Oe-Of) also becomes the substantially amplitude central value.

Accordingly, when the amplitude of the tracking error signal is measured in the state where the amplitude values of the outputs of the E and F sensors reach a suitable level, the amplitude value is large in the case of CD, whereas small in the case of DVD. In other words, discrimination between the CD and DVD can be made by measuring the amplitude value of the tracking error signal to determine whether it is larger or smaller than a reference amplitude value.

In the first embodiment shown in FIG. 1, the amplitude value of the tracking error signal produced by the tracking error producer 9 is detected by the tracking error signal amplitude detector 10, the detected value is compared with the reference amplitude value by the microprocessor 8. That is, the type of optical disc is determined by adjusting the amplitudes of the sub-beam spots to a suitable value by the gain/offset adjusters 6a and 6b and thereafter measuring the amplitude of the tracking error signal. Therefore, the types of discs can be discriminated without the track pitch identifying information used by the conventional apparatus. Further, the discrimination prior to application of the tracking servo becomes enabled.

Figure 6:
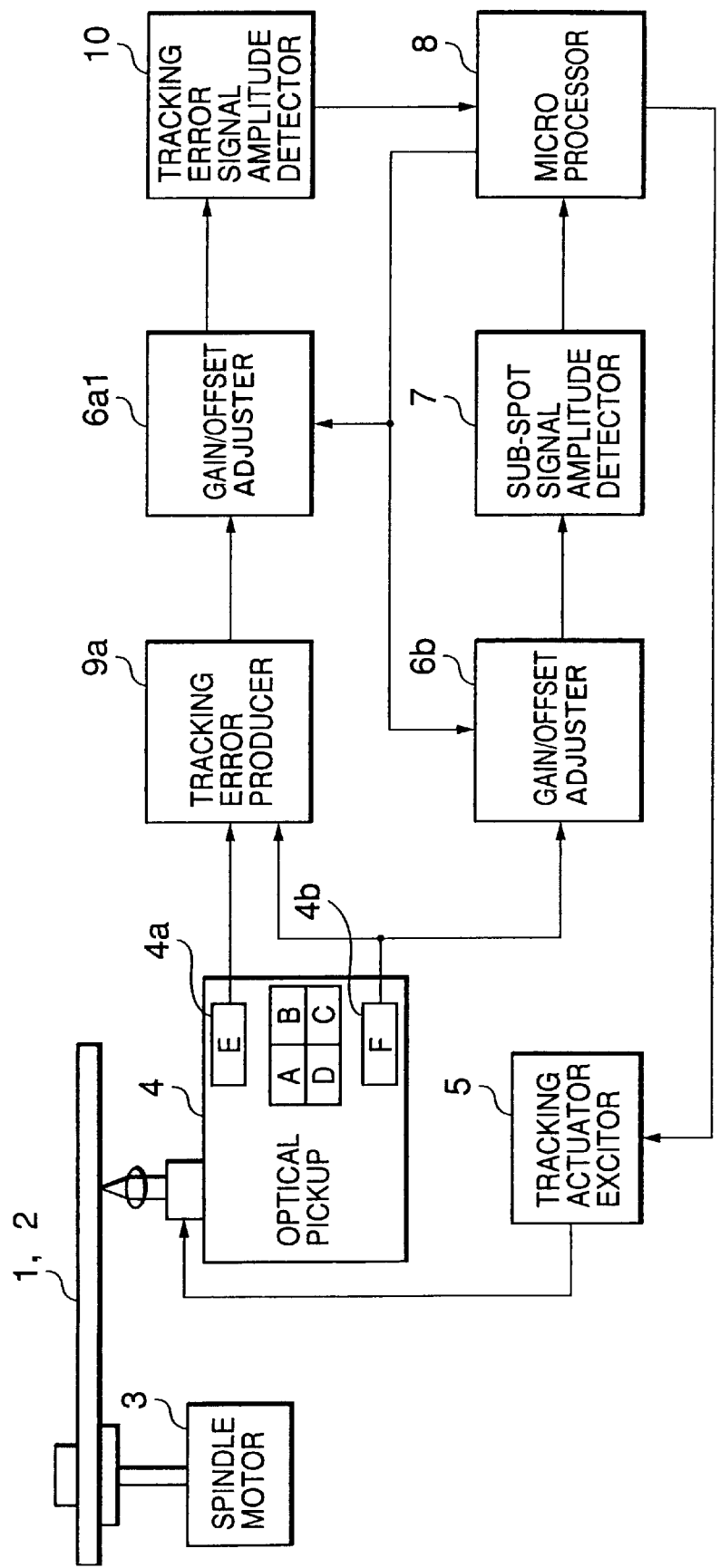
FIG. 6 is a block diagram showing a second embodiment of an optical disc discriminating apparatus according to the present invention.

FIG. 6 is a block diagram showing a second embodiment of an optical disc discriminating apparatus according to the present invention.

As shown in FIG. 6, a tracking error producer 9a directly accepts outputs from E and F sensors (optical detectors 4a and 4b) for measuring the intensity of a pair of sub-beams reflected from the signal recording layer of the optical disc 1 or 2 to take a differential of these signals thereby producing a tracking error signal. The tracking error signal is adjusted in gain and offset through a gain/offset adjuster 6a1 is input to a tracking error signal amplitude detector 10, where the amplitude of the tracking error signal is detected. The tracking error producer 9a may be provided in the optical pickup 4. Other constitutions are similar to those shown in FIG. 1.

Figure 7:
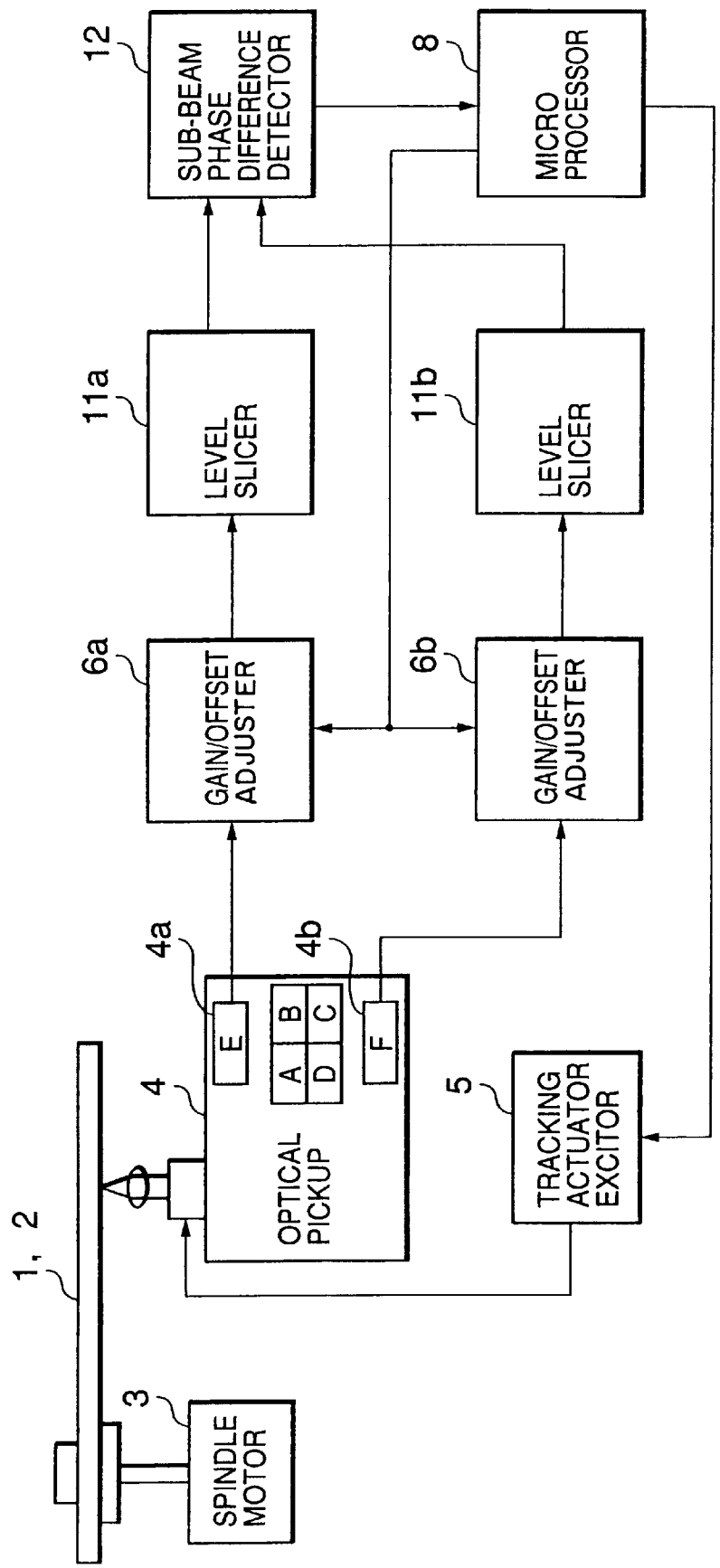
FIG. 7 is a block diagram showing a third embodiment of an optical disc discriminating apparatus according to the present invention.

FIG. 7 is a block diagram showing a third embodiment of an optical disc discriminating apparatus according to the present invention.

In FIG. 7, sub-beam signals obtained by E and F sensors (optical detectors 4a and 4b) are adjusted in gain and offset through gain/offset adjusters 6a and 6b in the method similar to the first embodiment shown in FIG. 1, binarized by level slicers 11a and 11b, and input to a sub-beam phase difference detector 12. A phase difference between the sub-beams e and f is detected by the sub-beam phase difference detector 12 that determines as to whether the detected phase difference is larger or smaller than a reference phase difference value.

Figure 8:
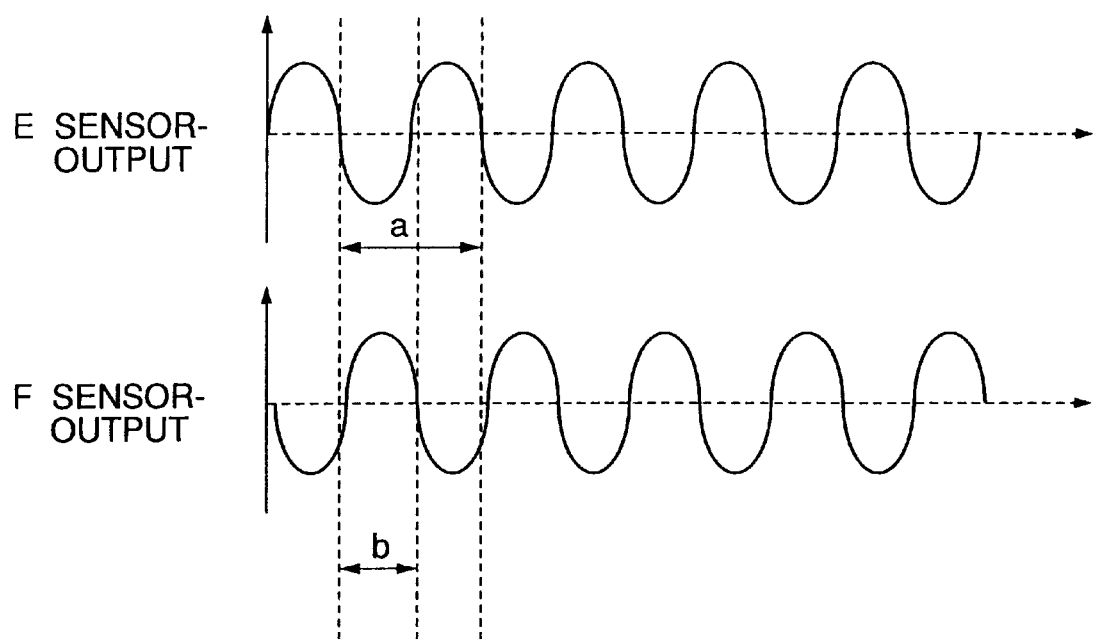
FIG. 8 is a view of assistance in explaining a phase relationship between sub-beam signals under the positional relationships shown in FIG. 2.
Figure 9:
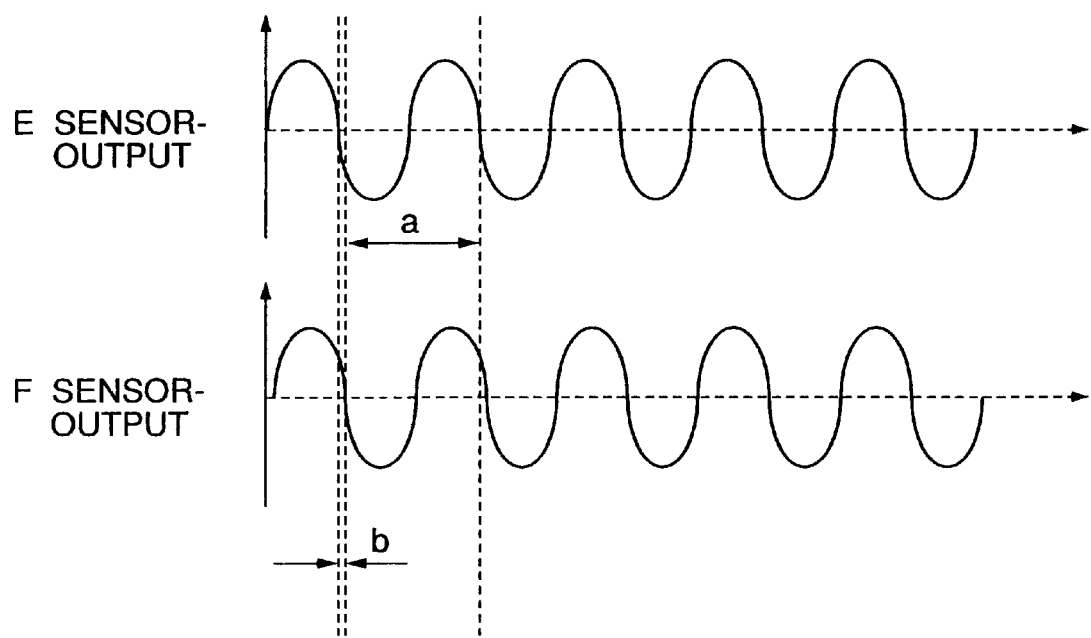
FIG. 9 is a view of assistance in explaining a phase relationship between sub-beam signals under the positional relationships shown in FIG. 4.

FIGS. 8 and 9 show a phase relationship of outputs of the E and F sensors of the optical pickup 4 as sub-beam signal outputs for reproducing CDs where the CD and DVD are rotated, respectively.

Since the positional relationship between one sub-beam spot and the other sub-beam spot is fixed, when the positional relationships between the beam spots and the tracks are displaced due to the eccentric of the disc or the operation of the tracking actuator exciter 5, the periods of the signals obtained from the E and F sensors are the same, but only the phase difference is changed according to the difference in discs.

The phase difference of the sub-beam signals where the CD is started is the reverse phase with phase deviation by approximately 180 degrees similar to the case of CD with 1.6 $\mu$m-track pitch as shown in FIGS. 2 and 3. On the other hand, the phase difference of the sub-beam signals where the DVD is started is substantially the same phase similar to the case of DVD with 0.74 $\mu$m-track pitch as shown in FIGS. 4 and 5.

In FIG. 7, the sub-beam phase difference detector 12 includes a first counter for measuring one period (a in FIGS. 8 and 9) of one sub-beam signal and a second counter for measuring a delay time (b in FIGS. 8 and 9) of the other sub-beam with respect to the one sub-beam signal. The detector 12 obtains the ratio between the measured value of the first counter and the measured value of the second counter, thereby obtaining the phase difference between a pair of sub-beam signals.

Thus obtained phase difference between a pair of sub-beam signals is compared with a predetermined phase difference value by a microprocessor 8 to determine whether it is larger or smaller than the reference phase difference value to make discrimination between the CD and DVD.

In the third embodiment shown in FIG. 7 described above, the phase difference of a pair of sub-beam signals is compared with a reference phase difference by the microprocessor 8 to discriminate between the CD and DVD.

Figure 10:
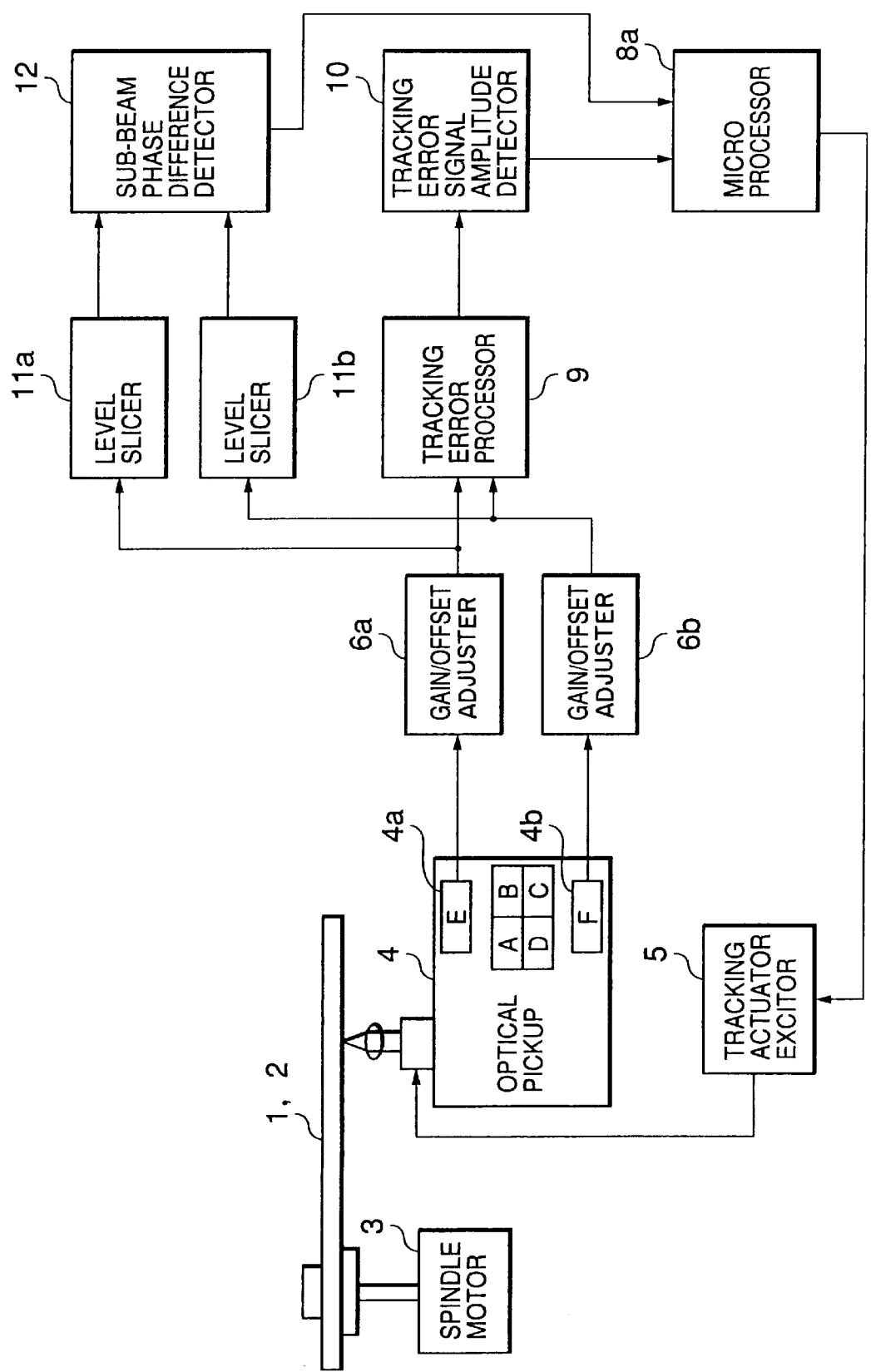
FIG. 10 is a block diagram showing a fourth embodiment of an optical disc discriminating apparatus according to the present invention.

On the other hand, in a fourth embodiment shown in FIG. 10, there are further provided a tracking error producer 9 for producing a tracking error signal on the basis of a differential of a pair of sub-beam signals output from a pair of sub-beam detectors 4a and 4b of the optical pickup 4 and a tracking error signal amplitude detector 10 for detecting an amplitude of the tracking error signal. A type of optical disc is determined on the basis of the results of both comparison between an amplitude of the tracking error signal from the tracking error signal amplitude detector 10 and a reference amplitude value set in a microprocessor 8a and comparison between a phase difference from a sub-beam phase difference detector 12 and a reference phase difference value set in the microprocessor 8a to thereby further improve the discriminating accuracy.

According to the present invention, an optical disc discriminating apparatus has an optical pickup that irradiates a main beam and a pair of sub-beams onto an optical disc to read a signal recorded thereon. The optical pickup has a pair of sub-beam detectors for detecting the sub-beams reflected from the optical disc to generate detection signals. A tracking error signal is produced on the basis of at least a differential of the detection signals. A type of the optical disc is judged on the basis of comparison between an amplitude of the tracking error signal and a reference amplitude. Or, it is judged on the basis of comparison between an phase difference between the detection signals and a reference phase difference. The optical pickup conducts tracking servo control on the basis of the detection signals after the judgement is made.

Therefore, the discrimination between types of discs can be made without using track pitch discriminating information recorded on the optical disc, and the discrimination prior to application of the tracking servo becomes enabled.

Further, according to the present invention, a type of an optical disc can be judged on the basis of comparison between the amplitude of the tracking error signal and the reference amplitude and between the phase difference and the reference phase difference. Thereby, the discriminating accuracy can be further improved.

What is claimed is:

1. An optical disc discriminating apparatus comprising:

optical means for irradiating a main beam and a pair of sub-beams onto an optical disc to read a signal recorded thereon, the optical means having a pair of sub-beam detectors for detecting the sub-beams reflected from the optical disc to generate detection signals;

a first detector to detect a phase difference between the detection signals;

judging means for judging a type of the optical disc on the basis of comparison at least between the phase difference and a reference phase difference, the optical means conducting tracking servo control on the basis of the detection signals after the judgement is made;

an adjuster to adjust gains and offset levels of the detection signals; and means for binarizing the detection signals the gains and offset levels of which have been adjusted, the first detector detecting the phase difference between the binarized detection signals.

2. An optical disc discriminating apparatus comprising:

optical means for irradiating a main beam and a pair of sub-beams onto an optical disc to read a signal recorded thereon, the optical means having a pair of sub-beam detectors for detecting the sub-beams reflected from the optical disc to generate detection signals;

a first detector to detect a phase difference between the detection signals;

judging means for judging a type of the optical disc on the basis of comparison at least between the phase difference and a reference phase difference, the optical means conducting tracking servo control on the basis of the detection signals after the judgement is made;

an adjuster to adjust gains and offset levels of the detection signals; and a producer to produce a tracking error signal on the basis of the detection signals the gains and offset levels of which have been adjusted; and a second detector to detect the amplitude of the tracking error signal, the judging means judging the type of the optical disc on the basis of comparison between the phase difference and the reference phase difference and between the amplitude and a reference amplitude.

* * * * *